(No Model.)
E. CLIFF.
CAR TRUCK.
No. 521,205. Patented June 12, 1894.
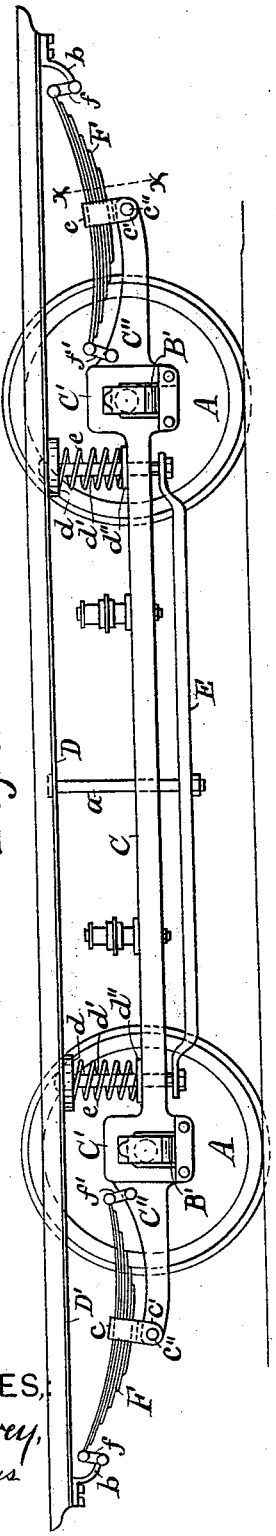
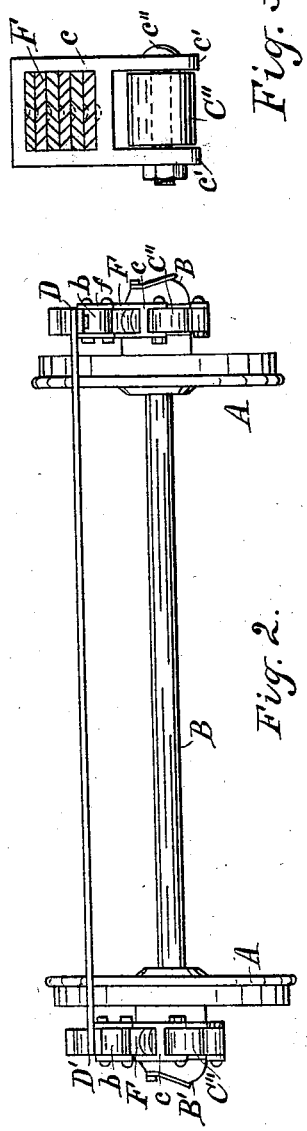
WITNESSES,
Mark W. Dewey,
H. M. Seamans
INVENTOR,
Edward Cliff
by C. H. Duell
his ATTORNEY.
THE NATIONAL LITHOGRAPHING COMPANY,
WASHINGTON, D. C.

UNITED STATES PATENT OFFICE.

EDWARD CLIFF, OF NEWARK, NEW JERSEY.

CAR-TRUCK.

SPECIFICATION forming part of Letters Patent No. 521,205, dated June 12, 1894.

Application filed September 8, 1893. Serial No. 485,121. (No model.)

*To all whom it may concern:*

Be it known that I, EDWARD CLIFF, a citizen of the United States, residing at Newark, in the county of Essex, in the State of New Jersey, have invented new and useful Improvements in Car-Trucks, of which the following, taken in connection with the accompanying drawings, is a full, clear, and exact description.

My invention relates to car trucks, particularly street car or motor trucks, and has for its object to provide supplemental springs for, what is known as the "extended spring-base" of a street car truck, that will be simple in their construction and more efficient in their operation. The reasons for extending the upper or movable frame of a street car truck being so well known, it will be unnecessary to repeat them here. Coil springs have been used as supplemental springs between the extended portions of the spring base or the so-called stationary frame of the truck and the car body, but were unsatisfactory. Full elliptic springs have also been used. These springs were rigidly secured to the stationary frame and were held between guides on the movable frame and were not compressed until the other truck springs had been partly compressed. This mode of construction caused pounding when the movable frame was depressed in contact with the supplemental springs and grinding when the movable frame vibrated longitudinally. By my invention hereinafter described these objections are overcome.

My invention consists in the combination, with a stationary frame supported upon the running gear, said frame having sections extending outwardly from the axle, of a movable frame supported upon said truck, spiral springs located between the movable and stationary frame, and a half-elliptic spring located between each extended section of the said stationary frame and the movable frame.

My invention consists also in the combination, with a stationary frame supported upon the running-gear, said frame having sections extending outwardly from the axle, of a movable frame supported upon said truck, spiral springs located between the movable and stationary frames, and a half-elliptic spring pivoted at or near its center to each of the extended sections of the stationary frame, and shackled, one end to the stationary frame and the other end to the movable frame, and my invention consists in certain other combinations of parts hereinafter described and specifically set forth in the claims.

In the drawings hereto annexed and forming a part of this specification, Figure 1 is a side elevation of my truck. Fig. 2 is an end elevation of Fig. 1 from either end, and Fig. 3 is a vertical section taken on line $x$, $x$, Fig. 1.

Referring specifically to the drawings, A A are the wheels, B B the axles and B' the axle-boxes.

I do not limit myself to the exact construction of the truck frames as they may be varied in form and construction without departing from my invention. I have shown the saddles C' supported on the axle boxes integral with the side beam, C, but they may be otherwise secured to said beams if desired or the beams may each be made in sections as usual.

C'' are the outwardly extending sections or parts of the side beams or stationary frame which form the bed of the extended spring base. Said sections C'' extend outwardly from the axle or axle-box some distance. The side beams together with any cross-beams connecting them is called the stationary frame for the reason that it is not affected by the movement of the car-body to any appreciable extent, and the other or upper frame D is called the movable frame for the reason that it moves upward and downward with the car-body or toward and from the other frame on its supporting springs.

The movable structure or frame, D, upon which the car-body rests is preferably rectangular in form, and is provided with extensions D'. Spring plates, $d$, $d$, are secured to the frame D and spring posts $d'$ $d'$ extend through said plates downwardly through the side beams C.

$e$, $e$, are coil springs surrounding the spring posts $d'$, $d'$, and seated at one end in the spring-plates $d$, $d$, and at their lower ends upon plates $d''$, $d''$ resting upon the side beams C. Two coil springs are located on each side beam between the axles, one spring near each axle. A bar E connects the lower ends of the spring posts $d'$, $d'$, together below the side beams. A post, $a$, passes through both frames and the connecting bar, E, on each side of the truck midway between the coil springs.

The extensions D' extend outwardly farther than usual for the purpose of giving a firm bottom for the car-body and supports for the spring hangers $b$, which are bolted to the lower side of the ends of the extensions.

In the drawings I show half-elliptic springs, F, located between the extensions of the stationary and movable frames. In the figures the extensions D' are much longer than the extensions C'' as the lower parts of the elliptic springs are used. The said springs are held at their center in a frame $c$, (see Fig. 3) having projections $c'$ extending downwardly from the lower side thereof and lying upon opposite sides of the end of the extended section C''. A bolt $c''$ passes through said projections of the frame, $c$, and the end of the extension C'' and forms a pivotal bearing for the spring F, allowing it to move somewhat longitudinally to accommodate itself to the movement of the car-body. The spring F lies preferably in an inclined position, that is, with its inner end or head lower than its outer end or head. The outer head lies just beneath the lower side of the movable frame and above the free end of the hanger $b$, secured to the end of the movable frame. The head is shackled or pivoted to the hanger by ordinary links $f$. The inner end or head of the spring is pivoted or shackled to the extension C'' near the axle box by links $f'$ extending downwardly from the head to the extension.

I do not limit myself to the half-elliptic spring pivoted at the center for it may be held rigidly at this point.

If found desirable the upper or movable frame may be dispensed with and the spring plates, posts and the hangers, $b$, secured directly to the sills or frame of the car body without departing from my invention.

Having described my invention, what I claim as new, and desire to secure by Letters Patent, is—

1. In a car truck, the combination, with a stationary frame supported upon the running gear, said frame having sections extending outwardly from the axle, of a movable frame supported upon said truck, spiral springs located between the movable and stationary frames, and a half-elliptic spring suitably secured to each of the extended sections of the stationary frame and connected at one head by a shackle to the movable frame, and connected at the other head by a shackle to stationary frame, substantially as described.

2. In a car truck, the combination, with a stationary frame supported upon the running-gear, said frame having sections extending outwardly from the axle, of a movable frame supported upon said truck, spiral springs located between the movable and stationary frames, and a half-elliptic spring pivoted at or near its center to each of the extended sections of the stationary frame, and shackled, one end to the stationary frame and the other end to the movable frame, substantially as described.

3. In a car truck, the combination, with a stationary frame supported upon the running-gear, said frame having sections extending outwardly from the axle, of a movable frame supported upon said truck, spiral springs located between the movable and stationary frames, and portions of elliptic springs located between the two frames, and connected to said frames by pivotal bearings only, substantially as described.

In testimony whereof I have hereunto signed my name.

EDWARD CLIFF. [L. S.]

Witnesses:
A. R. DENMAN,
ISAAC COHN.